United States Patent
Paul et al.

(10) Patent No.: US 7,104,443 B1
(45) Date of Patent: Sep. 12, 2006

(54) METHOD AND SYSTEM FOR FACILITATING ELECTRONIC FUNDS TRANSACTIONS

(75) Inventors: David K. Paul, Chico, CA (US); R. Scott Hatfield, Chico, CA (US)

(73) Assignee: Debitman Card, Inc., San Mateo, CA (US)

( * ) Notice: Subject to any disclaimer, the term of this patent is extended or adjusted under 35 U.S.C. 154(b) by 342 days.

(21) Appl. No.: 10/128,153

(22) Filed: Apr. 22, 2002

Related U.S. Application Data

(60) Provisional application No. 60/285,922, filed on Apr. 23, 2001.

(51) Int. Cl.
*G06K 5/00* (2006.01)

(52) U.S. Cl. .................. 235/380; 235/375; 235/379; 705/35; 705/41; 705/53

(58) Field of Classification Search ............. 235/379, 235/380, 375; 705/34, 26, 1, 35, 14, 52–53, 705/64–69, 39–45; 379/91.01
See application file for complete search history.

(56) References Cited

U.S. PATENT DOCUMENTS

| | | | | |
|---|---|---|---|---|
| 4,012,786 | A | * | 3/1977 | McKie et al. ............. 360/45 |
| 4,736,094 | A | * | 4/1988 | Yoshida .................. 705/41 |
| 5,255,182 | A | * | 10/1993 | Adams ................... 705/17 |
| 5,265,008 | A | * | 11/1993 | Benton et al. ............ 705/44 |
| 5,278,977 | A | * | 1/1994 | Spencer et al. ............ 714/3 |
| 5,448,047 | A | * | 9/1995 | Nair et al. .............. 235/440 |
| 5,457,305 | A | * | 10/1995 | Akel et al. ............... 705/45 |
| 5,663,546 | A | | 9/1997 | Cucinotta et al. |
| 5,684,965 | A | * | 11/1997 | Pickering .............. 705/34 |
| 5,689,100 | A | * | 11/1997 | Carrithers et al. ........ 235/380 |
| 5,777,305 | A | | 7/1998 | Smith et al. |
| 5,798,508 | A | * | 8/1998 | Walker et al. ........... 235/380 |
| 5,825,003 | A | * | 10/1998 | Jennings et al. .......... 235/379 |
| 5,852,809 | A | * | 12/1998 | Abel et al. ............... 705/26 |
| 5,991,410 | A | * | 11/1999 | Albert et al. ............. 705/78 |
| 5,999,596 | A | * | 12/1999 | Walker et al. .......... 379/91.01 |
| 6,006,205 | A | * | 12/1999 | Loeb et al. .............. 705/34 |
| 6,065,675 | A | * | 5/2000 | Teicher ................ 235/380 |
| 6,105,865 | A | * | 8/2000 | Hardesty .............. 235/380 |
| 6,119,104 | A | * | 9/2000 | Brumbelow et al. ........ 705/35 |
| 6,122,625 | A | * | 9/2000 | Rosen ................... 705/65 |

(Continued)

FOREIGN PATENT DOCUMENTS

EP        666549        8/1995

(Continued)

*Primary Examiner*—Thien M. Le
*Assistant Examiner*—Kumiko C. Koyama
(74) *Attorney, Agent, or Firm*—John P. O'Banion

(57) ABSTRACT

A method and system for executing electronic funds transactions using a merchant based debit (MBD) card in a merchant-centric system that provides for reduced fees to acquiring merchants and remitting a portion of the collected fees to issuing merchants. The system also preferably provides information sharing on consumer transactions with merchants to facilitate consumer based incentive programs and the like. The system operates over conventional card processing infrastructure and utilizes the ACH network, or equivalent, to settle the transaction from a consumer checking account, or a merchant account in the case of a prepaid MBD card. Using the system, merchants may elect to qualify customers based on their own criterion. A portion of the interchange fee is distributed to the issuing merchant associated transaction executed using the merchant based debit card. Embodiments are described for prepaid, fixed value, programmable, and refillable, forms of merchant based debit cards.

29 Claims, 9 Drawing Sheets

U.S. PATENT DOCUMENTS

| | | | | |
|---|---|---|---|---|
| 6,138,911 A | * | 10/2000 | Fredregill et al. | 235/383 |
| 6,169,974 B1 | * | 1/2001 | Baumgartner et al. | 705/39 |
| 6,213,390 B1 | * | 4/2001 | Oneda | 235/379 |
| 6,243,688 B1 | * | 6/2001 | Kalina | 705/14 |
| 6,308,886 B1 | * | 10/2001 | Benson et al. | 235/375 |
| 6,321,213 B1 | * | 11/2001 | Ito et al. | 705/39 |
| 6,336,095 B1 | * | 1/2002 | Rosen | 705/1 |

FOREIGN PATENT DOCUMENTS

| | | |
|---|---|---|
| GB | 2305393 | 4/1997 |
| GB | 2338814 | 12/1999 |
| WO | WO 95/12169 | 5/1995 |
| WO | WO 96/38801 | 12/1996 |
| WO | WO 01/82243 | 11/2000 |

* cited by examiner

METHOD AND SYSTEM FOR FACILITATING ELECTRONIC FUNDS TRANSACTIONS

CROSS-REFERENCE TO RELATED APPLICATIONS

This application claims priority from U.S. provisional application Ser. No. 60/285,922 filed on Apr. 23, 2001, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public files or records of the United States Patent and Trademark Office, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to electronic payment systems and more particularly to a financial instrument, in the form of a debit card, for use in executing electronic funds transactions.

2. Description of the Background Art

The volume of electronic payment transactions executed with credit cards, debit cards (on-line and off-line), and ATM cards at the point of sale has reached an annual level of approximately 45 billion point-of-sale (POS) transactions annually which represent over $1.1 Trillion in transactions. The transaction volume of electronic transactions is continuing to grow readily. Debit and checks currently represent 63% of total non-cash payments at the POS today and this percentage is expected to grow to 70% by 2010. Currently 18 billion checks are processed annually with merchants incurring an estimated $23 billion in check handling and fraud costs. As debit cards gain wider acceptance, the use and volume of checks is expected to decline. Debit transactions are surpassing credit transactions at the POS. It is anticipated that by 2010, non-cash POS transactions are expected to grow to 67 billion transactions with a transaction value of $4.6 Trillion (Nilson Report, Star System Inc.-Tower Group). The policies and operation for executing electronic transactions is currently determined by issuing banks which charge substantial transaction fees for processing these non-cash transactions. The fees collected for executing the transactions are borne by the merchants, typically retailers, and these transaction fees have continued to escalate. Even current automated clearing house (ACH) "check-based" debit cards such as "VISA Check"™ by VISA® and "Master Money"™ by MasterCard® subject the retailers to the same rate schedule as conventional VISA, MasterCard, and other similar credit card products.

The transaction fee paid by the merchant for a moderately sized purchase of $60 can approach $0.75. It will be appreciated that since a large percentage of point of sale transactions are executed using credit cards, debit cards, and ATM cards, the overall cost per transaction may significantly impact merchant profitability. The trend has been toward increasing use of debit instruments in relation to checks and credit card instruments, while the transaction cost for these instruments continues to increase, at the expense of merchants that accept the cards for payment.

As conventional debit, credit, and ATM transaction instruments are under the control of issuing banks, the merchants must follow the dictates of the banking institutions and consequently have no control over the process, and furthermore no access to consumer purchase information within the associated databases. As a result, the ability of the merchants to establish retailer loyalty and frequent buyer programs is severely diminished.

Therefore, a need exists for a point of purchase card-based electronic payment system which provides conventional features to consumers while reducing merchant processing costs and increasing the ability of merchants to access consumer transaction information for use in their own special incentive programs. The present invention satisfies those needs, as well as others, and overcomes the deficiencies of previously developed electronic payment systems.

BRIEF SUMMARY OF THE INVENTION

The invention provides a method and system for executing electronic funds transactions in which merchant issuers of secure merchant based debit cards and merchant acquirers of those cards execute electronic debit transactions via the current ACH network, or similar, while maintaining a measure of information control and reducing transaction costs. Transactions executed at acquiring merchants are subject to the collection of transaction fees, a portion of which is later disbursed to the merchant that issued the card used for a given transaction.

In the following descriptive material, the electronic funds instrument according to the present invention is referred to as a "merchant based debit" (MBD) card, the electronic funds transaction system of the present invention is referred to as the "merchant based debit card network". The terms "merchant" and "retailer", refer interchangeably to a merchant or retailer that has agreed to participate in the program as a card issuer, a card acquirer, or a combination thereof. A cardholder is considered to be a valid holder of a merchant based debit card having been qualified by a card issuing merchant or less typically the merchant based debit card network provider, or having alternatively deposited monies in exchange for a given value associated with the card. The term ISO identification number refers to the use of transaction card identifiers by the International Standards Organization (ISO), for example referring to the ISO 7812 specification. The term DDA refers to a Demand Deposit Account which is an account that allows for withdrawal at any time, the most common among these being a checking account. All other terms, and abbreviations of terms, comport with those used in the industry which would be readily understood by one of ordinary skill in the art.

The system generally comprises the use of a secure form of debit card, as issued by merchants to qualifying consumers, which may be utilized at the point-of-sale system of participating merchants which are connected over a network to card processing services and a merchant based card processing computer (or computers), having a merchant based debit card database, upon which programming is executed for identifying the cardholder, declining a transaction if the account transaction limits are exceeded, performing positive and negative card checks, settling the transaction through the card processing service from funds within the associated checking account, charging the acquiring merchant a fee for executing the purchase transaction, and preferably remitting a portion of the merchant fee to the merchant that issued the merchant based debit card. The point of sale transaction, using an ACH based debit card, or equivalent, does not go all the way back to the checking account for verification at the time of the transaction, rather it utilizes security features, such as PIN-PAN, daily use and velocity checking, and the checking of positive and negative files to determine if the card and account are valid and in good standing. In the event that a transaction executes and subsequently (i.e. after the float time) is unable to clear, such as due to non-sufficient funds (NSF), then a "return item" is generated with associated charges. The merchant based debit cards provide for executing an electronic funds transaction in association with the purchase of goods and/or services. Additionally, the merchant based debit card may be optionally utilized by a consumer to secure cash back in excess of the sale transaction.

The fee charged to the acquiring merchant can be considered to comprise a transaction fee and an interchange fee. Card usage within the present system is subject to lower transaction fees and interchange fees than typically required with conventional bank originated debit cards. Furthermore, the present invention is preferably configured to distribute a portion of the collected transaction fee, which preferably comprises a portion of the interchange fee, back to the issuing merchant which was responsible for issuing the debit card to the consumer.

By way of example, the merchant based debit card system may be implemented such that a ten cent interchange rate applies when a merchant's card is used at another participating retailer. A portion of the interchange fee, such as six cents, would be returned to the issuing retailer, while the operators of the merchant card debit network would receive four cents. An acquirer paid switch fee may also be charged to the acquiring merchant, such as five cents, to cover the costs associated with network maintenance.

The merchant based debit cards contain point of sale readable account information, such as within a conventional magnetic strip on the back of the plastic card, or within an embedded circuit as found on a smart card, or by use of a similar mechanism for retaining machine readable account information. It is preferred that all card numbers begin with the unique ISO identification assigned to the MBD cards.

It will be appreciated by one of ordinary skill in the art that the ISO identification number, and other card aspects, are checked (i.e. mod10 check) within current point-of-sale systems when executing a credit card transaction, however, the ISO is not checked on current PIN based debit cards. Therefore, the new ISO identifier as described for a PIN based merchant based debit card program within the present invention is inherently supported over the existing transaction infrastructure without the need of reprogramming existing point of sale transaction equipment.

To the consumer, the merchant based debit cards have an appearance and are utilized in the same manner as conventional debit cards, insofar as a given merchant has signed up as an acquirer to accept the cards as payment for goods and services. However, from the standpoint of the merchants, the use of the merchant based debit card system can significantly reduce transaction costs while increasing consumer patronage. In contrast to cards issued by banks, the merchant based debit cards are issued by participating merchants and are preferably associated with in-house incentive programs. The qualified consumers receiving a merchant based debit card are referred to as cardholders, and they are granted the privilege of executing purchase transactions at participating merchants. The merchant based debit cards are issued to consumers that qualify according to a screening process. The merchant may elect to fully or partially perform this account screening process In house, subject to certain restrictions and corresponding to the level of risk being assumed by the merchant. The merchant based debit cards may also be co-issued by said merchant in association with one or more guarantor entities which provide a payment guarantee to acquiring merchants on executed transactions in exchange for monetary considerations, such as a percentage of the transaction fee. Transactions are executed based on monetary amounts, and it will be appreciated that any underlying system of monetary value may be utilized, such as dollars, euros, yen, pesos, rubles, and so forth. Typically, the cards are utilized with the prevailing currency standard in the country of use.

Verified information and authorization are provided by the consumer for correctly establishing a path to a checking account from which they are authorized to disburse funds. Checking account information, such as account number and routing number as found on a voided check, are provided by the consumer (cardholder) through which payment remuneration is to be withdrawn when a transaction is settled. It will be appreciated that the checking account must be one from which the consumer is authorized to electronically disburse funds, such as by way of an ACH transaction.

It should be appreciated that ACH transactions are not checked for an NSF funds condition like a credit card, however, they are checked against positive and negative database files to assure the validity of the card and it use. If a NSF conditions does exist at the time of settlement then the account holder will be liable for the amount of the transaction along with processing and penalty fees generally identical to those for returned checks. ACH transactions are settled against the cardholder's account in 2–3 days after the transaction in a similar manner as checks, which is referred to as "float". It should be appreciated that conventional debit cards, that are not subject to processing as ACH check transactions, do not have a float period. Therefore, the "float" provided by the MBD card is a benefit for the cardholder, which is in contrast to the immediate settlement of an on-line forms of debit card. Another advantage of the MBD card is that the cardholder may change their checking account to different banks without the need of being issued a new card. The processing fees for electronic transactions using the MBD card provide a substantial savings to the merchants. Furthermore, issuing merchants are provided an incentive for issuing cards, while concomitantly each electronic transaction is guaranteed to the retail acquirer, thereby increasing the attractiveness of debit card use for acquiring merchants. Still further, the MBD card program allows the merchants to receive transaction information associated with the card for use in executing buyer incentive programs and the like. The MBD card may be implemented in a number of forms without departing from the teachings of the present invention.

In an additional embodied version of the card, referred to as a prepaid merchant based debit card, the consumer purchases the card for a given amount, or otherwise surrenders a given value, typically monetary, in exchange for the card or extension of credit on an existing prepaid card, and is therefore not required to submit qualifying information. The checking account number and routing number associated with a prepaid merchant based debit card comprise account information for a checking account which in this case is held by the issuing merchant, or a third party, responsible for issuing the prepaid fixed value cards. By way of example, a third party (manufacturer, distributor, franchiser, and so forth) may sell prepaid merchant based value cards to merchants for resale to the consumer. The checking account associated with a prepaid merchant based debit card is a checking account held by the issuing merchant, or a third party, as a source of funds to which limited access is provided, such as according to the amount for which the prepaid card was purchased. A prepaid version of the merchant based debit card may be issued by a merchant, or a third party establishment, in exchange for receiving monetary compensation, such as from a consumer purchasing the prepaid merchant based debit card, or in return for other valuable considerations. It should be appreciated that the prepaid cards may also be issued as incentives, bonuses, and so forth, wherein the issuing merchant, or a third party operating through the issuing merchant, provides cards to consumers based on these other forms of valuable consideration. It will further be appreciated that the monetary value associated with a fixed value merchant based debit card can in many cases be recharged upon receipt of additional funds to extend, or refill, the balance contribution associated with the card within the checking account from which funds will be drawn when utilizing the prepaid merchant based debit card.

Preferably, the merchant based debit cards are branded by the issuing merchant, wherein the face of the card is adapted with an indicia and trade dress associated with the given merchant. Therefore, it will be appreciated that the merchant debit card feature may be incorporated into traditional incentive cards, while new incentive programs may be tied to the issuance of new merchant based debit cards as a consequence of the transaction data being made available to the merchant through the merchant based debit card payment network.

Although the merchant based debit cards are issued by a particular merchant and may of course be utilized at that establishment, the cards may furthermore be accepted by any merchants that have signed on to participate as an acquiring merchant in a program associated with the merchant based debit card. A portion of the interchange fees collected from acquiring merchants when settling fund transactions are disbursed to the issuing merchant of the merchant based debit card, while the acquiring merchant is able to process a transaction at a significantly reduced transaction fee. These elements each are capable of reducing the effective transaction fee borne by the merchants, wherein the profitability of both issuing and acquiring merchants may be enhanced. Furthermore, the use of branded incentivized (also referred to as incented) merchant based debit cards can increase brand recognition and increase consumer brand loyalty.

The merchant based debit cards are preferably configured with one or more security features which prevent parties other than the cardholder from executing transactions with a given merchant based debit card. When tendered by a consumer card-holder for making an electronic payment, the merchant based debit card is subject to an approval process during which at least one unique personal identifier associated with the cardholder is utilized to verify cardholder identity. The identifier which provides the security feature of the card preferably takes the form of a personal identifier, such as a password or PIN, although other forms of positive identification, such as biometric information (fingerprints, retina scans, voice identification, and so forth) may be alternatively utilized. Preferably, the personal identifier comprises a PIN number that must be correctly entered before approval of the associated electronic funds transaction. If the merchant based debit card is approved over the merchant based debit card network, then the associated transaction is routed through a settlement bank, the transaction is executed, and the merchant that issued the specific card receives a portion of the collected interchange fee.

By way of example, and not of limitation, a guarantor company may be established as a co-issuer with the merchant to be responsible for transaction approval and providing a guarantee that the merchant receives the debit amount, less transaction related fees, on an approved transaction. It will be appreciated that by combining a unique personal identification, such as a PIN, with a debit card form of financial instrument it becomes a hybrid form of check card product.

The process of using the card is generally in accord with the following steps. First, the customer arrives at a participating merchant store to purchase goods by executing a transaction at a point of purchase system. Next, the customer, or a merchant employee, inserts the customers MBD debit card into a point of purchase card reader, or equivalent, after which the customer enters their personal identifier, such as keying in the digits of a PIN, or optionally/alternatively uses another form of identification (i.e. biometric). The customer may also elect to receive cash back from their purchase transaction. The cash back option can be allowed by the issuing merchant on some or all of its issued merchant based debit cards. The transaction enters the electronic payments processing network and is generally processed by a card processing organization that receives the transaction information and queries a database associated with the merchant based debit card program for approval criteria. If the transaction is approved, the merchant receives payment according to the amount of the debit, and is charged a transaction fee and interchange fee. It will be appreciated, therefore, that the use of MBD cards does not burden merchants with the need to purchase additional transaction processing equipment or to retrain employees, or customers to which cards are being issued, on processing or using the MBD cards.

The customer appeal of proprietary charge cards, generally offered by large retailer establishments, has been waning. One factor in this decrease may be the large number of retailers available which runs counter to the desire of the consumer not to carry a handful of store specific charge cards, and the associated separate billing statements to be processed. In contrast to this, the merchant based debit (MBD) card may be enabled ubiquitously across the merchant landscape, as it may be accepted by both the issuing merchant and any other merchant that agrees to accept the use of the card, by signing on as an acquiring merchant, or by using a third party card processing service that is configured to process MBD card transactions. Wherein the portion of the interchange fee, or other remuneration, is still directed to the issuing merchant based on a transaction using the MBD card. As can be seen, therefore, the invention is a substantial departure from conventional systems employing debit cards in that the merchant is the issuer and the merchant receives an interchange. The operators of the merchant based debit card network receive a portion of the interchange fee, as well as any optional fees, such as acquirer-paid switch fee, to cover the costs of operating the network and to generate a profit. Furthermore, it will be appreciated that collections on MBD cards provide an additional profit center for the operator of the MBD card network. These collections are facilitated as consumers must provide address and account information from their checks in order to qualify for the MBD card. In addition, it will be noted that any incentives accrued by the consumer are held, or optionally automatically surrendered, if the MBD card is in arrears or is sent to collections.

The merchant based debit card program, therefore, differs from conventional charge and debit instrument programs in a number of respects, because the merchant based debit card program is designed to be merchant-friendly, and accordingly the MBD card program and system is configured in a "merchant-centric" manner. First, the fees associated with purchase transactions, which are paid by the acquiring merchant, are reduced. Second, the issuer of the merchant based debit card preferably receives an additional monetary incentive based on the monetary volume of transactions being executed with the given merchant based debit card, such a portion of the interchange fee. Third, the policies governing the operation of the system are configured to aid the merchant in efficiently conducting business, in particular with regards to providing access to consumer transaction information to facilitate the implementation of customer loyalty programs and similar transaction activity related programs. Fourth, the MBD card can be utilized ubiquitously among retailers and other merchants which execute charge and debit card transactions, as it may be accepted by parties other than the issuing merchant. Furthermore, the MBD card program confers ample incentive for merchants to accept the cards for payment, even if they are not in a position to become an issuer of the MBD cards, which should rapidly increase the universality enjoyed by users of the MBD cards.

An object of the invention is to reduce the transaction costs borne by merchants for electronic purchase transactions.

Another object of the invention is to include the merchant into the transaction process so that special in-house programs, such as purchasing incentive programs, may be facilitated.

Another object of the invention is to provide a branded merchant debit card that may be utilized at a variety of merchants.

Another object of the invention is to provide a debit card in which issuing merchants receive a portion of the collected interchange fees associated with the amount of card utilization.

Another object of the invention is to provide a debit card in which no point of sale bank fees are charged to the consumer.

Another object of the invention is to provide a secure debit card with a unique identification feature, such as a PIN number, which limits fraudulent usage.

Another object of the invention is to provide a debit card in which merchants can elect to be fully or partially engaged in customer qualification for card issuance.

Another object of the invention is to provide a debit card in which the DDA account information (such as routing and transit number) for a given card may be changed without the need of issuing a new card.

Another object of the invention is to provide a merchant based debit card system which may be conventionally utilized at point-of-sale system by cardholders.

Another object of the invention is to provide a merchant based debit card system which may utilize existing point of sale transaction systems and associated infrastructure.

Another object of the invention is to provide a merchant based debit card system in which the net amounts from ACH settled transactions may be guaranteed to the acquiring merchant.

Another object of the invention is to provide a merchant based debit card system that may be deployed as a national network.

Another object of the invention is to provide a debit card program that can be easily integrated into merchant loyalty, frequent buyer, or other merchant programs.

Another object of the invention is to provide a debit card system in which the consumer purchase information is available for the benefit of merchants, such as for adjusting benefit accrual within an incentive based program.

Another object of the invention is to provide a non-banked version of a merchant based debit card which is tied to an amount deposited within the checking account of an issuing merchant, such as a check cashing facility, or third party, wherein even those without checking accounts may purchase a prepaid merchant based debit card for their use.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus, system and/or method generally shown in FIG. 1 through FIG. 9. It will be appreciated that the apparatus and system may vary as to configuration and as to details of the components, and that the method may vary as to the specific steps and sequence, without departing from the basic concepts as disclosed herein.

Figure 1:
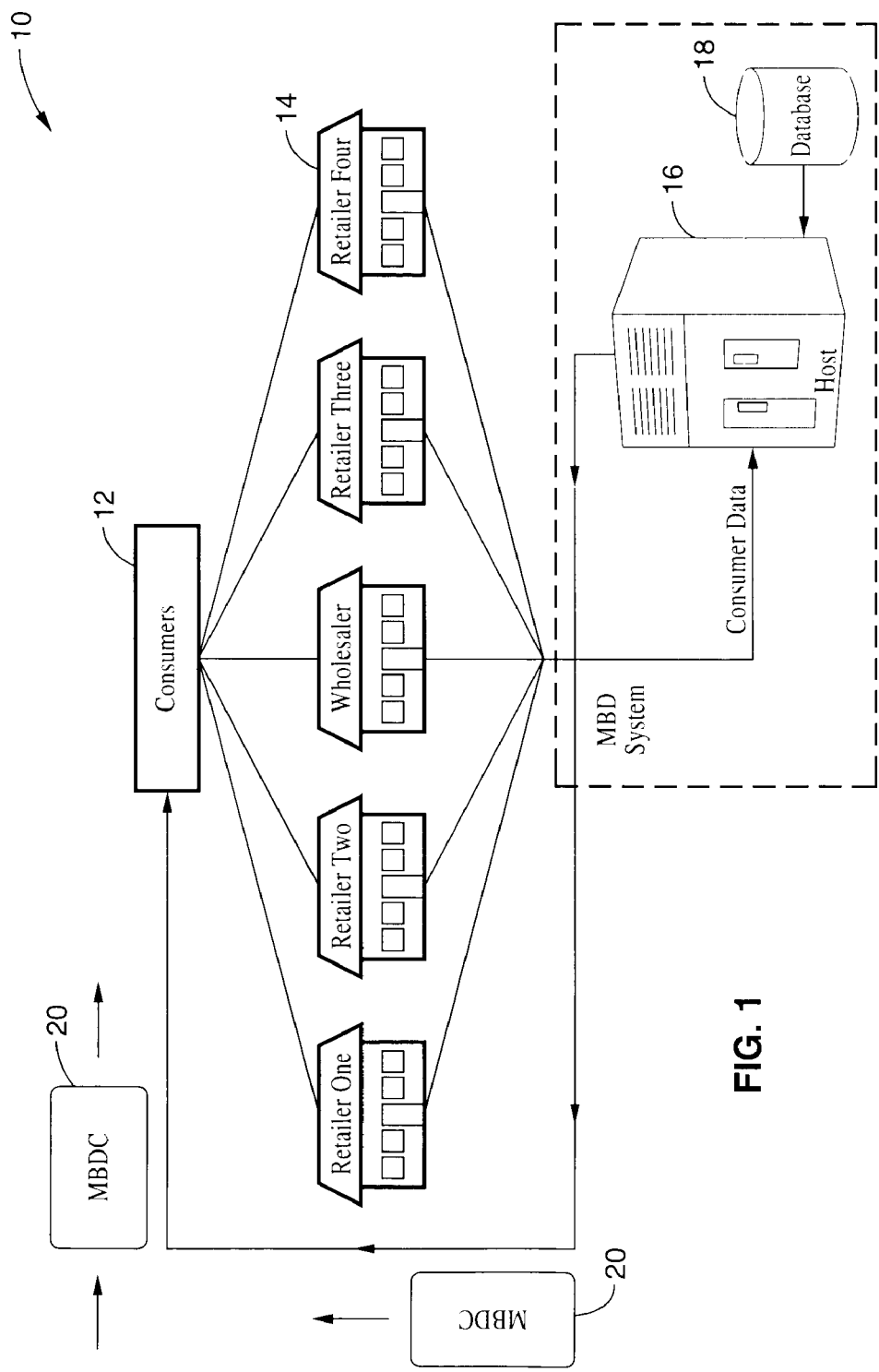
FIG. 1 is a block diagram of the MBD card issuance process according to an aspect of the present invention, shown with MBD cards being issued through a number of merchant, or retailer, entities.

FIG. 1 exemplifies an issuance process 10 for merchant based debit (MBD) cards according to an embodiment of the present invention. The present invention provides a MBD card and an associated network of issuers and acquirers. In the card issuance process, consumers 12 apply for a card at issuing merchants 14. If they are suitably qualified, then consumer information is entered into the merchant system and they are entered as cardholders into the MBD system through MBD card host 16 associated with a database 18 and subsequently issued a merchant based debit card 20, such as a secure magnetic striped card that requires the entry of a PIN for use in validating a transaction. It will be appreciated that the application process may be executed using traditional paper-based forms, in-store clerical entry, or consumer "self-serve" on-line sign-up stations may be provided to readily qualify and sign up new card holders.

Underlying the present network is a set of MBD card operating rules which are considered to articulate the requirements to issue, authorize, and settle debit transactions as set forth by the "merchant based debit card network provider", such as a corporation, or other form of governing entity, which typically maintains the cardholder databases and associated databases on a host computer system. Furthermore, a network enabled computer, or computers, are adapted to communicate over the card processing network with card processing services, and merchants. A cardholder database is associated with the computer, or computers, as a repository for cardholder, merchant, and transaction information for identifying cardholders, facilitating the execution of transactions, remitting portions of the interchange fee with issuing merchants, and sharing selected cardholder transaction information (which is in response to the execution of electronic funds transactions using the merchant based debit card) with participating merchants, such as for use to implement cardholder incentive programs. The merchant based debit card network provider collects interchange and other fees and distributes a portion of the interchange fees to merchants (retailers) that have issued the merchant based debit cards. The merchant based debit card network provider additionally provides adjudication of claims, returns, and other items as provided for in the merchant based debit card network operating rules.

Figure 2:
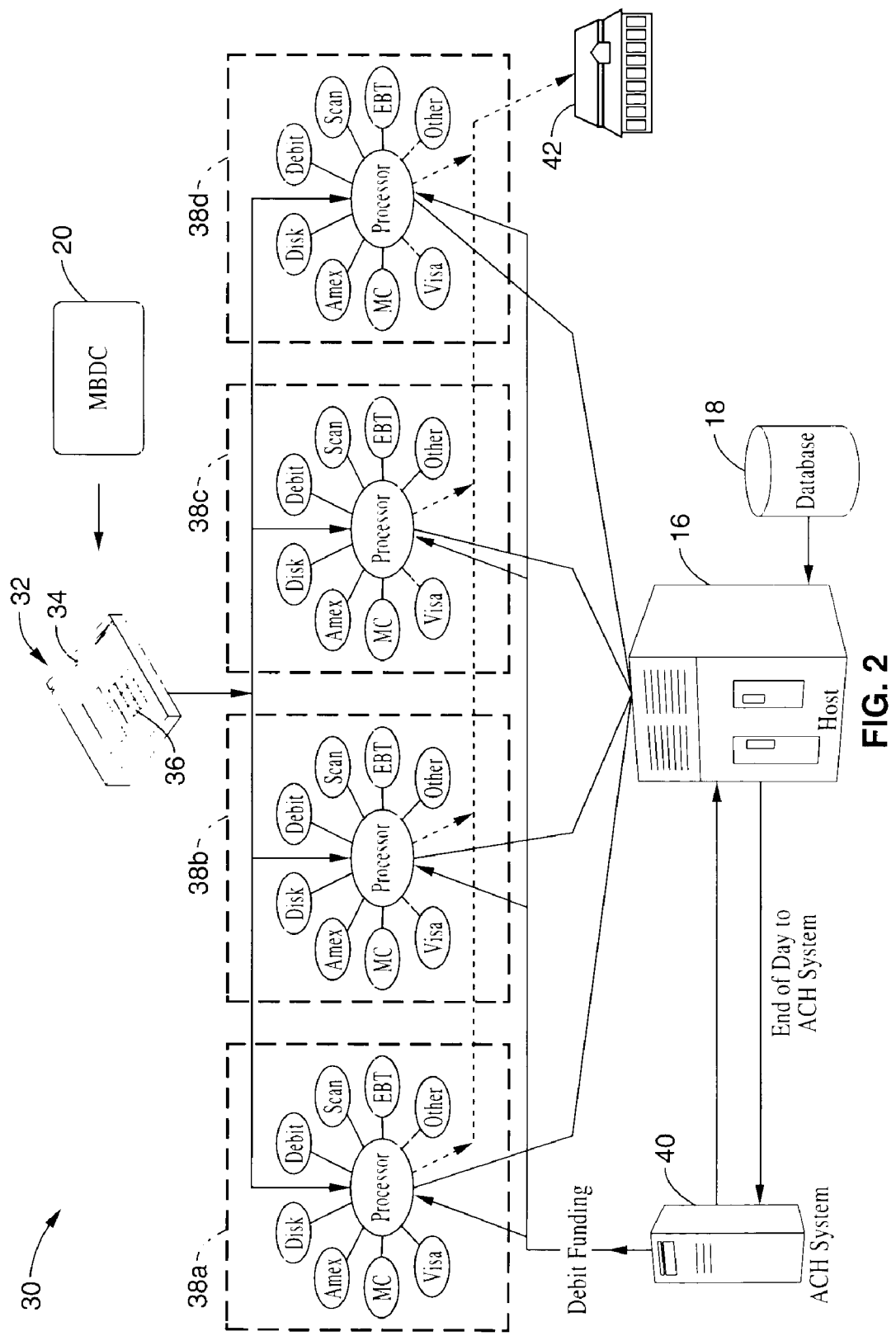
FIG. 2 is a block diagram of funding flow during a POS transaction using a MBD card according to an embodiment of the present invention, shown with a customer MBD card being swiped through a point of sale terminal device during a purchase transaction.

FIG. 2 depicts transaction processing 30 wherein a MBD card 20 is accessed, such as by swiping through a point-of-sale terminal 32 during transaction execution. The MBD card network is preferably designed for use with existing point-of-sale infrastructure, such as transaction terminals at the point-of-sale. A conventional point-of-sale (POS) terminal 32 is configured for accessing information on the MBD card, such as by means of slot 34 through which card 20 may be slid to allow reading of the magnetic strip, along with an optional set of keys 36 for entering a PIN number and making additional cardholder selections. It will be appreciated that the terminal may be alternatively, or additionally, adapted with one or more identification registration mechanisms, such as biometric sensors for registering fingerprints, retina scans, voice identification, and so forth, without departing from the teachings of the present invention. The merchant based debit card is configured to utilize the same transaction communication path and processing infrastructure that are in place for processing conventional PIN-based on-line debit transactions. The POS terminal 32 is generally connected to third party card processing services 38a–38d, such as EFunds®, BuyPass®, Concord®, PayPoint®, and similar services which execute the transaction in relation with the merchant based debit card network host 16 and an associated database 18 which can contain cardholder information, merchant information, transaction information, and other data as required for administering the system. It should be appreciated, however, that a large merchant may elect to provide their own card processing services and be linked directly with MBD card host 16. The transactions are generally accounted for in the same manner as current on-line debit transactions and included in the daily and monthly totals for the merchant. The transactions are posted at the end of each day in a batch-mode process at the end of each day, such as through the ACH system 40, which executes a funds transfer from the checking account of the cardholder to the card processing services 38a–38d which then deposit the net monetary amount of the transactions, less transaction and interchange fees, to an account 42 associated with the acquiring merchant.

Figure 3:
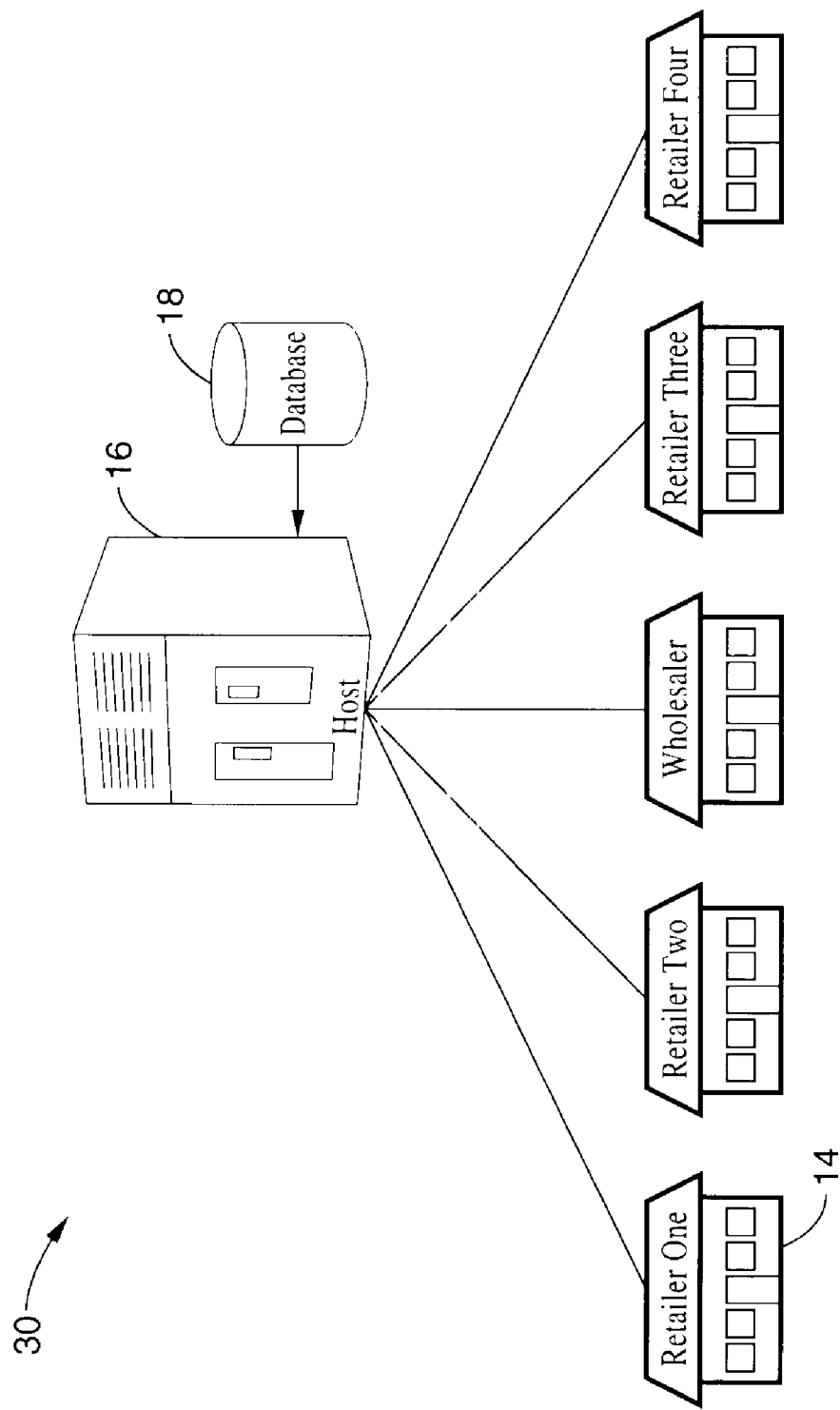
FIG. 3 is a block diagram of interchange fee distribution for the MBD cards according with an aspect of the present invention.

FIG. 3 illustrates remitting of a portion of the fees, such as interchange fees, collected from acquiring merchants to issuing merchants 14, in response to information provided by host 16 in conjunction with database 18. It will be appreciated that each acquired transaction directed at the MBD card is recorded wherefrom a portion of the interchange fees paid by the acquiring merchant may be remitted to the issuing merchant. Basing the present merchant debit card system on the current transaction infrastructure eliminates the necessity for investing in additional point-of-sale hardware or the need to train store personnel on utilizing a new transaction process. In addition, the use of a card for executing a transaction is well known and accepted by consumers.

It is envisioned that issuing merchants will primarily comprise multi-location retail businesses. The merchant based debit card is expected to be typically distributed as a co-branded card, wherein the card contains the primary identification for the issuing merchant on the front of the card, and includes a logo associated with the merchant based debit card network on the reverse. The debit card is configured with a means for retaining account information, such as a magnetic stripe, and all card numbers should begin with the unique ISO identification number assigned to the merchant based debit card. The issuing merchant is responsible for compliance to network rules for card issuance and will share in the interchange fees paid for each transaction by the acquiring merchants.

The merchant based debit card described herein may be integrated within existing merchant loyalty identification cards, thereby allowing the retailer to utilize existing cards and expand into the use of low-cost MBD card payment functionality with minimal investment. To stimulate usage, the retailer can provide incentives for card usage among their customers. The use of the merchant based debit card would have a favorable impact, relative to conventional card usage, on the time necessary to complete the transaction at the point of sale and a significant cost reduction to alternative debit and credit card payments.

A merchant may participate in the merchant based debit card network as an issuing merchant, an acquiring merchant, or both. Associations or other groups that provide electronic payment services to retailers, such as card processing services, may also participate as issuers of the cards. Merchants may want to participate solely as an acquiring merchant so as to benefit from the reduced cost per transaction in relation to conventional electronic payment transactions. Merchants may desire to participate to a further degree and gain additional benefits by becoming both an acquiring merchant and an issuing merchant to gain benefits from both the reduced transactions costs accorded to the acquiring merchant and the interchange fee revenue which accrues to the issuing merchant.

A merchant joining the merchant based debit card network contractually agrees to abide by the operating rules and regulations as stated in the associated network operating rules, and further agree to abide by the rules and regulations applicable to POS ACH debit, regulation E of the Federal Code and other laws incorporated into and a part of the merchant based debit card network operating rules.

The merchant based debit card network provider maintains a host data center, which includes the necessary databases required to provide account screening for card issuance, card database management, payment processing including authorization, financial settlement and reconciliation, returns management and collection. The merchant based debit card network provider preferably offers additional services to affiliated acquiring merchants, and issuing merchants, such as guaranteed payments and services associated with the collection of returns.

Figure 4:
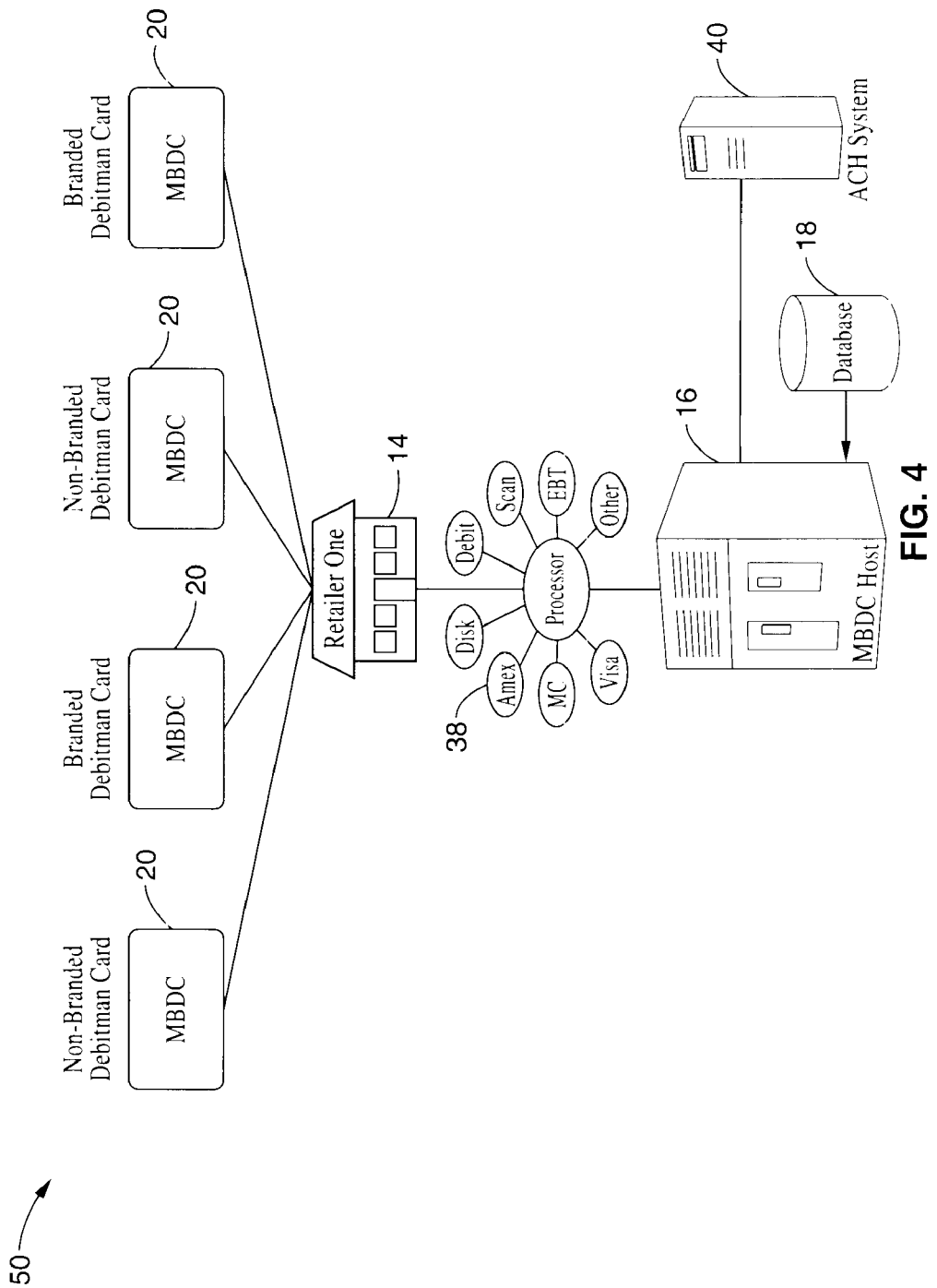
FIG. 4 is a block diagram of branded and non-branded MBD cards being used to execute transactions according to an aspect of the present invention in which the MBD cards are purchased having an established dollar transaction limit.

FIG. 4 illustrates the use of prepaid merchant based debit cards for use in a "non-banked" application 50, wherein the debit cards are issued for an associated monetary amount, such as deposited with a merchant, or similar establishment. It will be appreciated that the cards may be issued as branded cards containing merchant-specific trade dress, or alternatively containing third party trade dress, indicias, and so forth, or displaying images graphics, text, and so forth which are not substantially directed toward the issuing merchant or other merchant companies. The use of branded cards having appropriate indicias and trade dress provides beneficial advertising and enhances the recognition of the merchant in the marketplace. A prepaid fund form of the MBD card is exemplified in this figure which operates somewhat differently than the debit card described previously, wherein funds were drawn from a consumer checking account. Prepaid merchant based debit cards will preferably be made available for purchase by consumers at participating merchants. These prepaid cards may be marketed to consumers that lack a checking account, or that otherwise desire limiting their exposure to monetary risk from a lost or stolen card. These debit cards may also form a merchant-to-merchant form of gift card, allowing a consumer to utilize the value of the card at a number of participating merchants. The prepaid cards are particularly well-suited for sale by check-cashing establishments and similar venues whose patrons may not qualify for, or otherwise be in possession of a checking account.

Referring to the figure, the prepaid (MBD) merchant based debit cards 20 may appear as conventional branded, or non-branded, debit cards. Consumers purchase these prepaid merchant based debit cards from merchants 14 that elect to sell the prepaid debit cards having a preprogrammed or merchant programmed card value. The cash value of the card is then associated with a checking account of the merchant, or alternately a guarantor or a third party entity, wherein executing a transaction with the card results in deducting a given cash amount from the associated merchant checking account, or alternately the guarantor or third party entity. A prepaid card that is preprogrammed is typically sold in fixed monetary values, for example $20, $25, $50, $100, and so forth. A card that is programmed by the merchant can be configured for any level of associated monetary value.

A prepaid version of the MBD card is processed in a similar manner as the regular non-prepaid card, wherein the MBD card 20 is swiped at a point-of-sale terminal at merchant 14, which communicates with a card processing service 38 that accepts that type of card and it communicates with the merchant based debit card host 16 with associated database 18 for validating identification and executing a transaction, such as through ACH system 40. It will be appreciated that the data fields that describe a prepaid MBD card within database 18 may differ from those for a non-prepaid card. In particular, the amount that a particular prepaid MBD card is programmed for may be optionally included in the database, wherein a further check on remaining monetary value prior to a transaction may be carried out. Funds are drawn (ACH) from merchant checking accounts associated with funds by which the non-banked debit cards are purchased, which is contrasted to banked debit cards in which the funds are drawn (ACH) from the checking account of the consumer. The operation of both forms of merchant based debit card (prepaid funds and consumer charged funds) are substantially similar.

Figure 5:
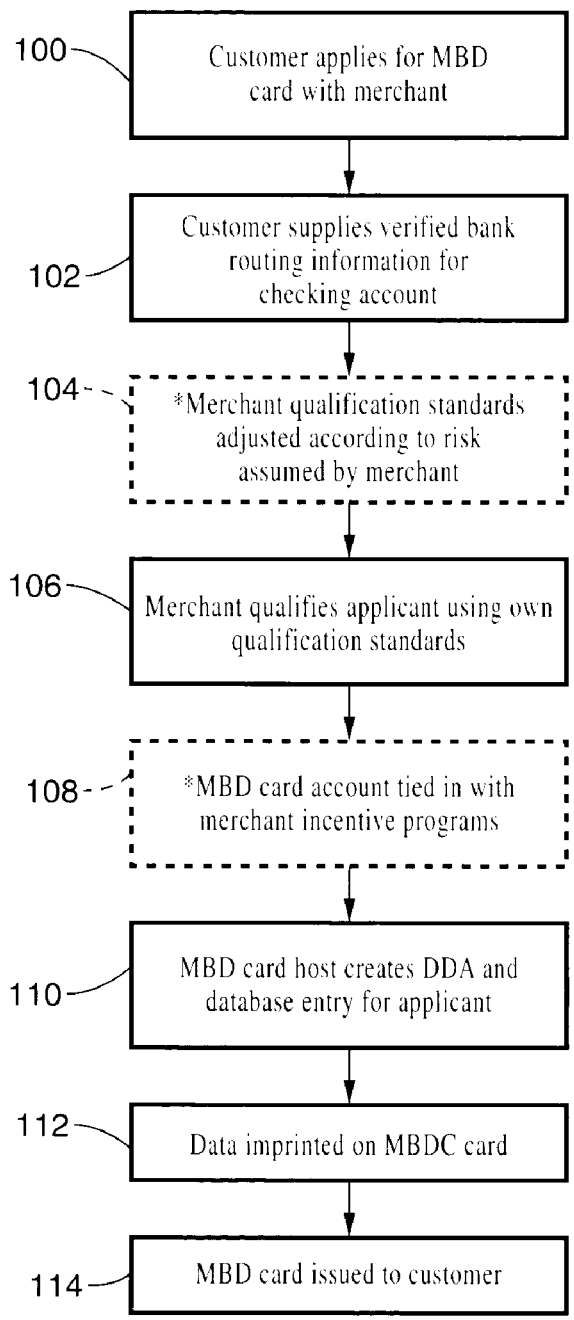
FIG. 5 is a flowchart of the issuance of a MBD card according to an embodiment of the present invention.

FIG. 5 illustrates the general process of issuing a (non-prepaid) merchant based debit card wherein funds are withdrawn from an associated cardholder account according to the execution of a purchase transaction. A consumer applies for the merchant based debit (MBD) card through an issuing merchant at block 100. The consumer supplies information in block 102 to allow disbursing funds from their checking account. The charge information preferably includes checking account number and bank routing information (preferably verified by a voided check), and other information, including address, which is deemed necessary for facilitating the collection of funds and item returns. The application preferably also authorizes the merchant based debit card network provider to represent and collect any returned items electronically including any fees for NSF (non-sufficient funds) as allowed by law.

Participating issuing merchants provide an electronic file to the merchant based debit card network provider for use in populating the host database for the given merchant. The network structure preferably includes remote entry to allow issuing merchants to update their associated information and gather transaction information about their cardholders within the host file on a real-time basis, such as for the purpose of adding consumers or updating information including changing a PIN or DDA number within an account, and so forth. The merchant based debit card network provider preferably utilizes an internet-based application process to facilitate activation of new cardholders and to minimize the costs associated with cardholder set-up.

An initial screening process is utilized by the merchants to qualify consumers to become cardholders. The qualification process determines the credit worthiness of the applicant in terms of the guidelines established from the merchant based debit card network provider. However, the issuing merchant can establish their own qualification procedure as represented by optional block 104, subject to merchant based debit card network operating rules and the assumption of additional risk as warranted. The merchant based debit card network provider may assume any selected level of risk and guarantee authorized transactions at its discretion according to the form of contract with the merchant and any associated third party organizations. The criteria for initial screening and the proportional sharing of interchange fees will typically dictate this decision. The merchant qualifies the prospective cardholder to receive a merchant based debit card according to their agreement with the merchant based debit card network, as shown in block 106. The merchant may optionally tie the issuance of the MBD card with merchant incentive based programs as reflected by block 108, wherein for example consumers earn considerations for using the MBD card for making purchases at the merchant location and other locations accepting the MBD card.

The programming of the host computer of the merchant based debit card network preferably validates the DDA through a pre-note process for a given applicant to ensure that the path to the checking account of the consumer is correctly established, as depicted by block 110. The consumer information, along with any necessary security feature information is then imprinted and encoded into the merchant based debit card in block 112 and issued to the consumer at block 114.

The issuing merchants would typically manage the handling of lost and stolen cards themselves, albeit with initial information and support from the merchant based debit card network provider. Since the MBD cards cannot preferably be utilized without a corresponding personal identifier, such as a PIN, the liability for unauthorized use of lost or stolen cards should be minimal. Replacement of lost and stolen cards is envisioned to generally be a responsibility of the issuing merchant.

Figure 6:
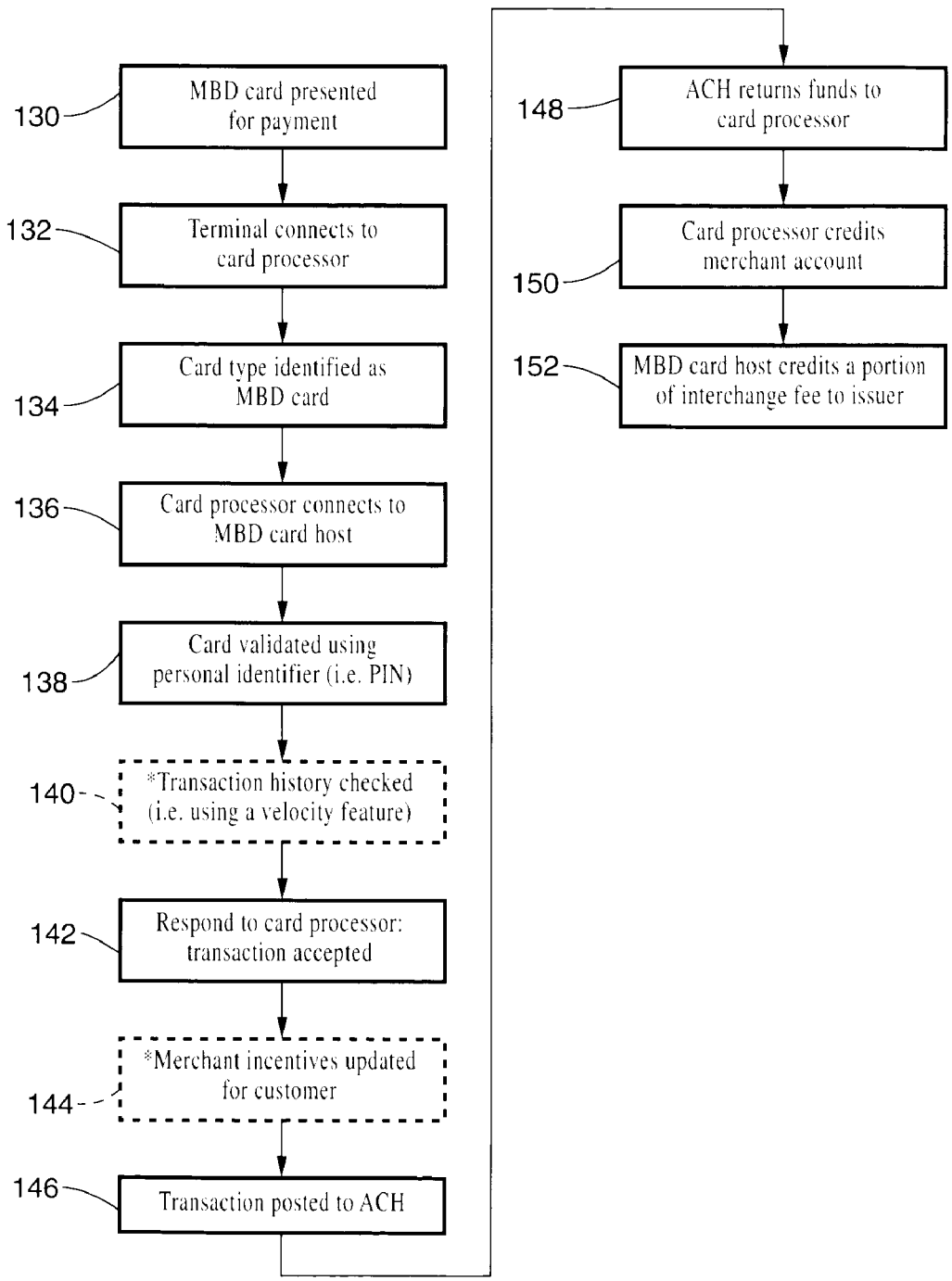
FIG. 6 is a flowchart of transaction processing of a MBD card according with an aspect of the present invention.

FIG. 6 depicts the flow of transaction processing, wherein the merchant based debit (MBD) card may be presented at block 130 as a means of payment by the consumer at any authorized acquiring merchant and is read by an associated terminal at block 132, the card type is identified as a MBD card in the transaction network as per block 134. The merchant POS system routes the transaction message, such as including PAN, PIN, and Amount, directly to the merchant based debit card network host computer as represented by block 136, or through a third party processor that has been certified for accessing the merchant based debit card network host.

The transaction message is generally communicated through any number of communication links, typically telecommunication links, from third party processors or directly from an acquiring merchant. Once the transaction message is received by the merchant based debit card network host, a series of validation routines are performed, as represented by block 138. The first activity verifies that the personal identifier matches that on file for the cardholder. For example, the PIN must match the PAN as recorded in the database. If a match does not occur, a declined message is returned to the point of sale terminal. The issuing merchant will determine the extent of the next series of validations and define specific parameters. Attempted transactions are preferably evaluated according to transaction limits, also referred to as card usage limits, associated with a specific merchant based debit card. The transaction limits may comprise either a monetary limit for a single transaction, a limit on the rate of monetary transactions, or utilize combinations thereof. Preferably, other forms of verification are performed such as checking a database of historical information, generally referred to as a positive file which indicates accounts which are active and valid, and negative files which contain information on accounts that are invalid, or otherwise unacceptable, such as those accounts associated with a stolen or lost card, fraud, and so forth. A number of firms offer positive and negative file database services including SCAN® and TeleCheck® to stop losses associated with bad checks, or in this case ACH based debit card transactions.

Validation according to optional sets of limits, such as a variable velocity feature may also be performed within the present system as shown in optional block 140. A time sensitive usage value, such as variable velocity, can be used to evaluate allowable card use according to one or more time sensitive usage values. In particular, a typical variable velocity implementation validates a transaction subject to a set of parameters such as the amount of the transaction, daily frequency of card use, and optional additional time sensitive values. Another series of validations determined by the issuing merchant include both positive and negative files that serve to reduce the risk of a returned item. If the merchant based debit card network cardholder currently has an outstanding returned item, the transaction request is declined until the issuing merchant reinstates the cardholder. Once the validations are completed, a return message authorizing the transaction is sent to the point of sale terminal as represented by block 142.

The information from the transaction may be optionally utilized for updating information relating to merchant incentive programs, represented by block 144, which are associated with the transaction.

The approved transaction is matched to the DDA information, which comprises routing and transit number, on the database file and an ACH, automated clearing house, record is created. All transactions processed in the business day are consolidated in a batch file and delivered to the ACH for settlement as shown by block 146, by way of a designated originating depository financial institution (ODFI). Each transaction record preferably includes sufficient information to identify the place and time the transaction occurred to facilitate the inclusion of this information in the consumer's bank statement. The merchant based debit card network provider is preferably configured for settling transactions in a periodic batch mode, such as may occur daily, wherein funds may be returned to the third party card processor and issuing merchants, as represented by block 148, while credits are thereafter credited to the merchant account as represented by block 150. It will be appreciated that ACH processing is subject to "float", such as 1–3 days, from the execution of the electronic transaction and settlement with the associated checking account. The MBD host thereafter preferably credits a portion of the fee charged for the transaction, such as a portion of the interchange fee, to the issuing merchant as per block 152.

Transactions returned for non-sufficient funds (NSF) are preferably represented electronically up to two times depending on the policy of the issuing merchant. If merchant based debit card network provider has guaranteed the transaction to the issuing merchant and acquiring merchant, the transaction is represented twice along with the returned item fee authorized by the cardholder. If the item fails to clear, a collection process will commence. The card will typically be shut down immediately by the MBD card network if a collection problem arises, such that no additional debt is incurred. The account holder is liable for the amount of the transaction in addition to fees for a returned check transaction, and any associated bank fees. If the card issuer is responsible for the returned item, the MBD card network provider is capable of representing the item electronically based on the guidance and policy of the issuing merchant and delivers the information related to unsuccessful collections to the issuing merchant and the item is charged back to the account of the issuing merchant. The processing of ACH administrative returns is preferably handled by administrative personnel associated with the merchant based debit card network provider, which may include daily database updates on required changes.

It is envisioned that merchants desiring to lower their cost per electronic payment transaction will sign on as acquiring merchants to accept the merchant based debit card. Once established in the network, an acquiring merchant gains the ability to execute transactions in the same manner as on-line PIN debit transactions, wherein the processing, settlement, and reporting functions as seen by the acquiring merchant are identical, albeit more merchant-friendly. An acquiring merchant of course is required to comply with the merchant based debit card network operating rules and to pay interchange and transaction fees associated with card processing, whether by a third party or performed in house.

A card processor which receives transaction information associated with a MBD transaction is required to connect to the merchant based debit card network host, which is governed by a network interface specification that governs the technical connection requirements. Connection certification is typically to be required prior to transaction processing, and the operating rules govern the ongoing processing activity. The interchange fees and other processing fees are generally to be collected and settled daily with the merchant based debit card network host.

It will be appreciated that many aspects of the MBD card are applicable to implementation of a variety of additional and alternative card forms, without departing from the teachings of the present invention as claimed. Market acceptance, card usage, and growth may dictate the number and variety of MBD card variants which are offered. One such variant already described in a prepaid MBD card, although additional cards such as gift cards, purchase cards, and others associated with the MBD system may be implemented subsequently.

Figure 7:
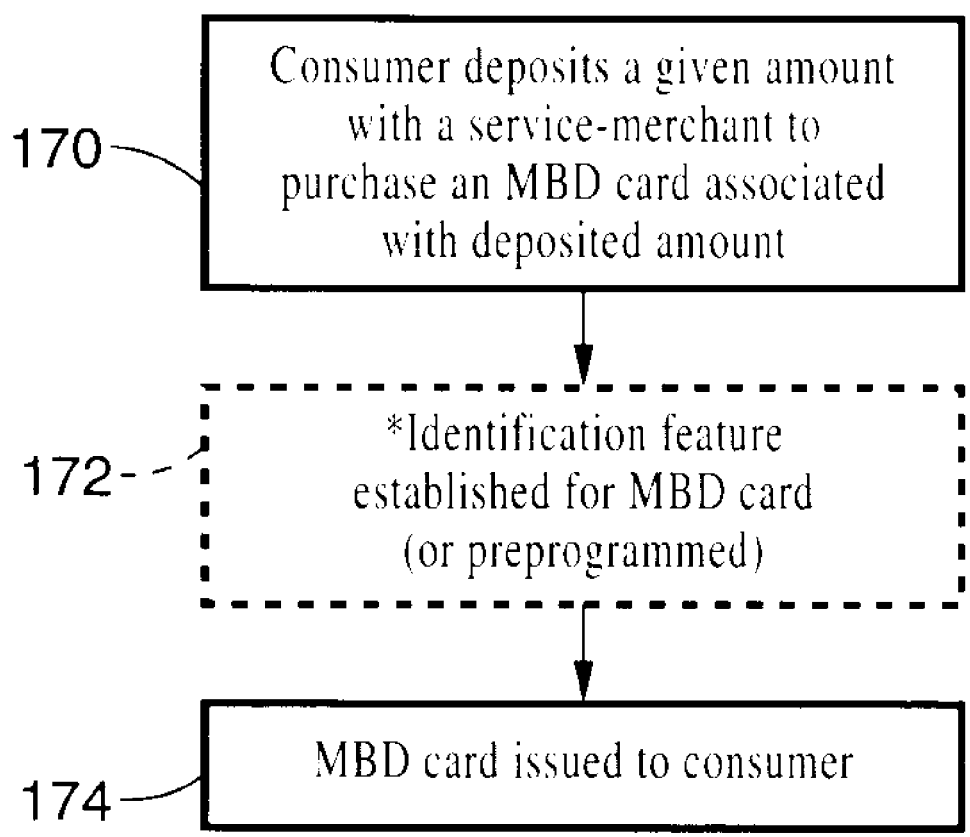
FIG. 7 is a flowchart of the issuance of a preprogrammed prepaid value non-banked MBD card according to an aspect of the present invention.

FIG. 7 represents the basic card issuance process for the prepaid version of the MBD card, wherein the consumer purchases the card for a given amount, or otherwise provides remuneration in associated with the receipt of a card or credit balance increase, and is therefore not required to submit qualifying information, because the checking account number and routing number are associated with a prepaid merchant based debit card comprising account information for a checking account which is held by the issuing merchant, or a third party providing services to said merchant, that is responsible for issuing these prepaid fixed value cards. The consumer "deposits" a given amount with a service merchant as represented by block 170, although typically this transaction would be considered a purchase transaction wherein the user is purchasing a new card (fixed value or loadable value) or is applying funds to increase the balance of an existing prepaid MBD card. Preferably, an optional identification feature is established for the MBD card as depicted by block 172, such as a PIN or other personal identification means, so that card use is cardholder specific. It will be appreciated that the prepaid cards may be provided without identification means, according to the dictates of card value and card application. In one aspect of the present system, the card purchaser is optionally allowed to choose whether the identification feature is included in the prepaid card. The prepaid MBD card is then issued to the consumer, as represented in block 174, and may be utilized as described previously for MBD cards that are not prepaid, however, operation of any optional incentive programs could be absent, or otherwise differentiated, when purchases are made utilizing the prepaid MBD card.

Figure 8:
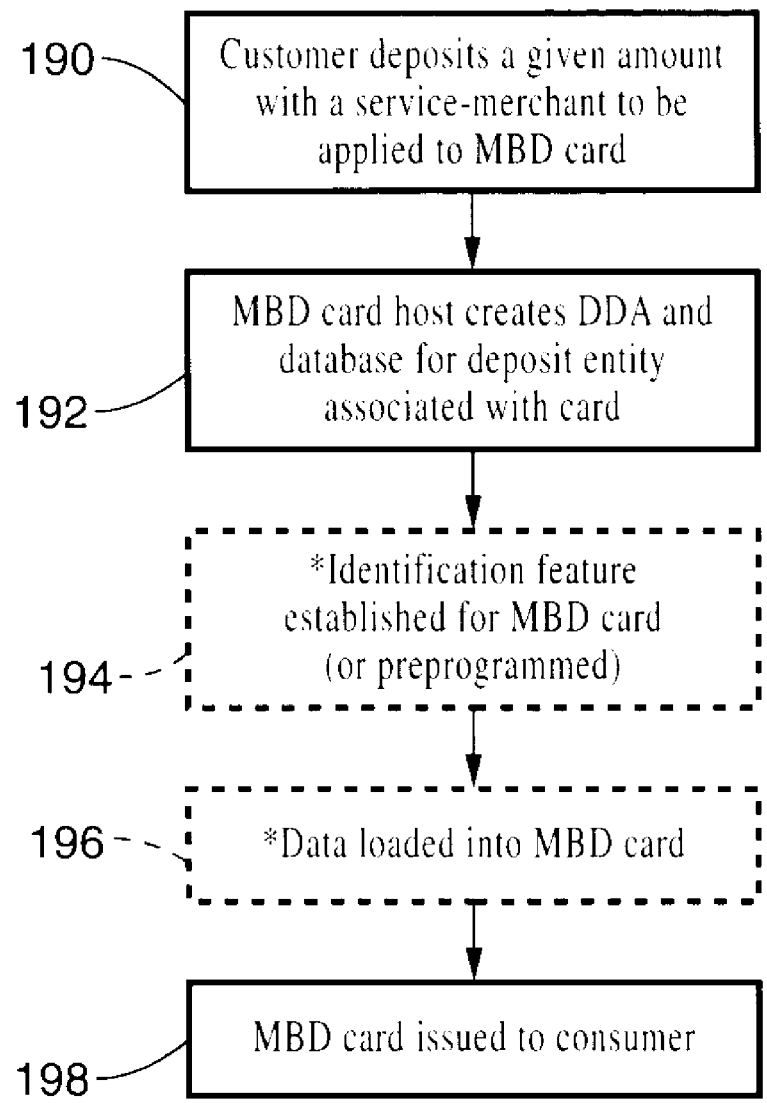
FIG. 8 is a flowchart of a merchant programmed prepaid value non-banked MBD card according with an aspect of the present invention.

FIG. 8 depicts merchant programming of a prepaid value "non-banked" MBD card in response to receipt of monies, shown in block 190, such as a deposit or purchase transaction, from a customer which is to be applied to the card value. The MBD card host creates the appropriate DDA entries in block 192 for the checking account associated with the card, which is typically the party receiving the deposit, either directly or indirectly, which includes third party card merchants and so forth. The card may optionally be configured with an identification feature as per block 194, either which is established for the card or preprogrammed for the given card. Data may then be optionally loaded to the MBD card as per block 196, or to the associated issuing merchant database, and the card issued as represented by block 198 to the consumer.

Figure 9:
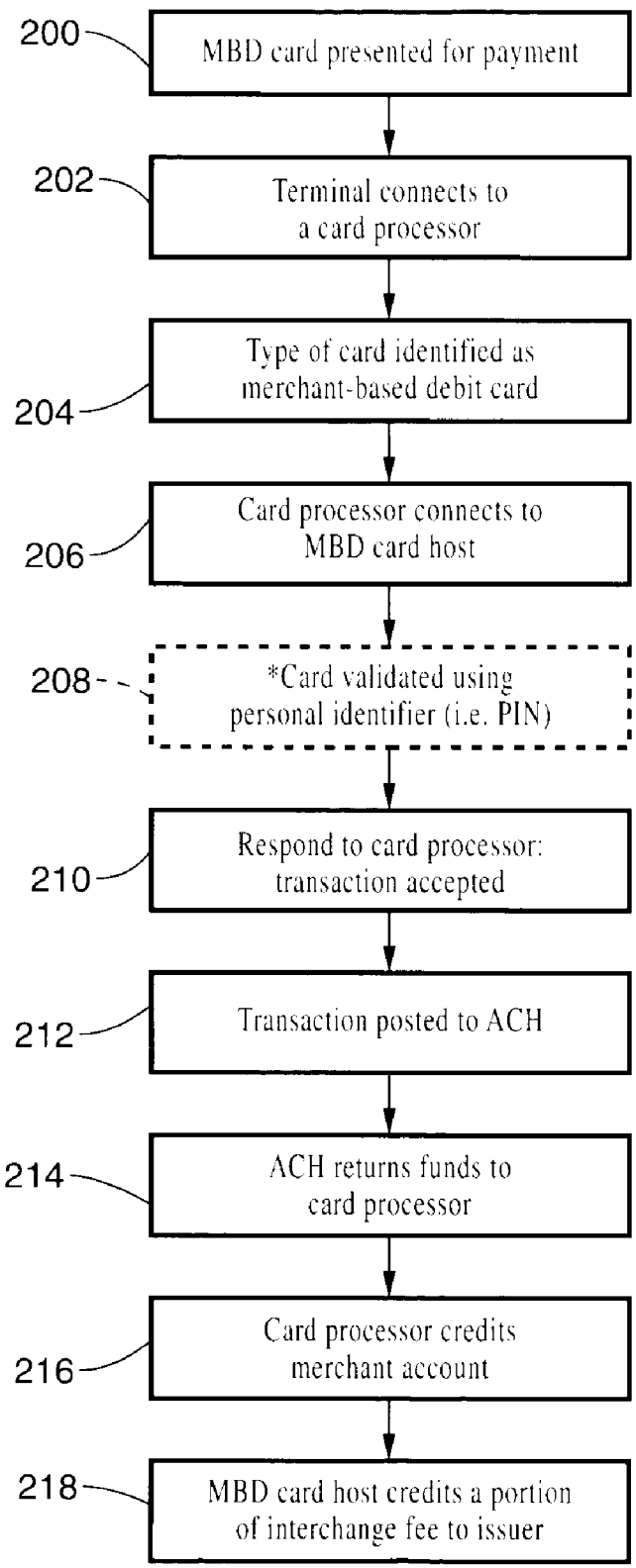
FIG. 9 is a flowchart of transaction processing utilizing a prepaid value non-banked MBD card according with an aspect of the present invention.

FIG. 9 represents the use of a prepaid MBD card by a consumer. The card is presented for payment at block 200 by the consumer is read by a transaction terminal that connects to a card processor at block 202, wherein card type, MBD, is identified at block 204. The card processing entity connects to the associated MBD card host at block 206, and the card is preferably validated at block 208 if optional identification features have been defined for the issued card, whereby the transaction may be accepted as per block 210. It will be appreciated that due to the anonymity with which prepaid cards may be purchased, a card value remaining balance may be optionally retained within the MBD host system as additional security to thwart attempts at altering or circumventing the value for which the card was purchased. At some point after transaction execution, the transaction is posted to ACH at block 212, which returns funds to the card processor as per block 214, the card processor credits the associated merchant account 216, and a portion of the transaction fee collected is credited to the issuing merchant at block 218. The portion of the fee credited to the issuing merchant is shown being preferably a portion of the interchange fee.

It is contemplated that a third party (manufacturer, distributor, franchiser, and so forth) may sell prepaid merchant based value cards to merchants for resale to the consumer. The checking account associated with a prepaid merchant based debit card is a checking account held by the issuing merchant, or a third party, as a source of funds to which limited access is provided, such as according to the amount for which the prepaid card was purchased.

Accordingly, it will be seen that this invention provides a method and system whereby merchants can support electronic transactions executed by consumers without the attendant high transaction costs associated with traditional charge and debit card use. The invention provides incentives for issuing merchants which receive a portion of the interchange fee collected for each transaction executed using a given merchant based debit card. It will be appreciated, however, that the fee structure described may be varied without departing from the present invention. By way of example and not of limitation, portions of fees may be distributed as percentages back to both acquiring and issuing merchant, the monies returned to either merchant party need not be associated with the interchange fee, consumer use incentives may be automatically provided and/or supported (such as when consumers use the MBD card at issuing merchant), and similar further variations which could be implemented by one of ordinary skill in the art without inventive creation. The present system also aids merchants by preferably, sharing transaction information with the merchants to facilitate consumer incentive and loyalty programs by the merchant. In addition, the merchants can establish their own set of consumer qualification criterion whose standards are commensurate with the level of fiscal responsibility accepted by the merchant. One or more security features, such as a PIN number, are preferably required when utilizing the merchant based debit cards to reduce fraudulent use. The system of the present invention may be implemented in a number of ways within the transaction infrastructure without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for facilitating electronic funds transactions between a cardholder and a participating merchant, comprising:
    a debit card having a card number and containing point of sale readable account information, as part of a plurality of said debit cards issued to consumers within a merchant-based debit card program;
    said card number beginning with a unique International Standards Organization (ISO) identification number assigned for the given merchant based debit card network to which transactions are routed for processing:
    said debit card is issued by a merchant, participating in said merchant-based debit card program as an issuing merchant, to a qualified consumer;
    said qualified consumer becomes a cardholder having a privilege under said debit card program to execute purchase transactions at a plurality of merchants participating in said merchant-based debit card program as acquiring merchants in response to submitting valid demand deposit account (DDA) information for a checking account of the cardholder;
    a network enabled computer having a debit card data base of cardholder information, information on participating acquiring merchants, and merchant information associated with a plurality of issuing merchants participating in said merchant-based debit card program:
    said network enabled computer is adapted for communication through conventional card processing services and point of sale transaction terminals at participating acquiring merchants; and
    programming associated with said computer for,
        receiving transaction information through said conventional card processing services from point of sale transaction terminals in response to an attempted purchase transaction by said cardholder using said debit card,
    verifying cardholder identity associating a personal identifier with customer information from said data base,
    issuing a declined message and terminating card processing if the card is invalid or the requested transaction falls outside the limits of card usage, accepting said transaction executing said debit transaction for the checking account associated with the cardholder DDA utilizing an automated clearing house (ACH) network,
    settling the transaction at a time subsequent to the execution of said transaction through a card processing service from funds retained within the associated checking account,
    charging the acquiring merchant a fee for executing said transaction, and
    remitting a portion of said charged fee to the issuing merchant of said merchant based debit card.

2. A system as recited in claim 1, wherein said debit cards are branded by a given said merchant with an indicia and trade dress to advertise and enhance recognition of said merchant in the marketplace.

3. A system as recited in claim 1, wherein a consumer must provide personal identification in addition to DDA information including checking account number and routing number to become qualified for said debit card.

4. A system as recited in claim 1, wherein said issuing merchants perform the qualifying of said consumers and assume at least a portion of the responsibility for said transactions.

5. A system as recited in claim 1:
    wherein said merchant based debit card is co-issued by said issuing merchant and a guarantor entity;
    wherein said guarantor entity provides a guarantee to acquiring merchants as to the payment of executed transactions; and
    wherein said guarantee is made to said issuing merchant by said guarantor in exchange for monetary considerations thereof.

6. A system as recited in claim 1, wherein said identifier comprises a personal identification number (PIN) associated with said cardholder.

7. A system as recited in claim 1, wherein said participating issuing merchant controls issuance of merchant-based debit cards which are used to execute transactions at merchants that have signed up in the merchant-based debit card program as acquiring merchants.

8. A system as recited in claim 1, wherein said programming is further adapted for the sharing of selected information with said issuing merchants from said consumer database information.

9. A system as recited in claim 1, wherein said programming is further adapted for evaluating the requested transaction in relation to predetermined account limitations prior to accepting of said transaction.

10. A system as recited in claim 1, wherein said limits of usage on said merchant based debit card comprise transaction limits, rate of use limitations, or a combination thereof.

11. A system as recited in claim 10, wherein said limits on card usage comprises a variable velocity feature which evaluates proper card use according to one or more time sensitive usage values.

12. A system as recited in claim 1, wherein said conventional card processing services are performed by a third party processor or by a merchant which provides its own card processing services and is linked directly to the network enabled computer of the merchant-based debit card program.

13. A system as recited in claim 1, wherein said merchant based debit card network maintains a host data center, including databases for providing account screening for card issuance, card database management, payment processing including authorization, financial settlement and reconciliation, returns management and collection.

14. A system as recited in claim 1, wherein said programming is further adapted to provide issuing merchants access to consumer transaction information within said database as collected in response to transactions executed on said merchant-based debit card program.

15. A system as recited in claim 1, wherein said programming is further adapted to allow issuing merchants to change cardholder account information within the database of said merchant debit card network without the need of issuing a new card.

16. A method for executing electronic funds transactions, comprising:
receiving of a merchant based debit card by a merchant participating in a merchant based debit card program as an acquiring merchant;
said merchant based debit card having a card number beginning with a unique International Standards Organization (ISO) identification number assigned for the given merchant based debit card network to which transactions are routed for processing:
said merchant based debit card issued to a cardholder which qualifies by submitting valid demand deposit account (DDA) information for a checking account and valid identification information;
said merchant based debit card is received as a form of payment from a cardholder desiring to execute an electronic funds transaction in connection with a checking account held by said cardholder for which said checking account and identification information was submitted and is associated with said merchant based debit card;
verifying cardholder identity by associating a personal identifier with customer related information from a database of cardholder and merchant information associated with a plurality of issuing merchants participating in said merchant based debit card program to prevent parties other than the cardholder from executing transactions with said merchant based debit card;
issuing a declined message and terminating card processing if the card is invalid or otherwise unacceptable, or the requested transaction falls outside the limits of card usage;
setting the transaction through automated clearing house (ACH) from funds retained within said associated checking account;
charging the acquiring merchant a fee for executing said funds transaction; and
remitting a portion of said charged fee to the merchant which issued said merchant based debit card to said consumer.

17. A method as recited in claim 16, wherein said personal identifier comprises a personal identification number (PIN) associated with said cardholder.

18. A method as recited in claim 16, wherein said merchant based debit cards are branded with indicia and trade dress associated with the issuing merchant.

19. A method as recited in claim 16:
wherein said checking account is a checking account held by said cardholder;
wherein said cardholder was required to supply a checking account number and routing number for a checking account from which funds are to be disbursed when settling transactions executed with said merchant based debit card.

20. A method as recited in claim 16:
wherein said merchant based debit card is received as a form of payment by conventional card processing services performed by a third party processor or by a merchant which provides its own card processing services and is linked directly to the network enabled computer of the merchant-based debit card program.

21. A method as recited in claim 20, wherein said merchant based debit card network maintains a host data center, including databases for providing account screening for card issuance, card database management, payment processing including authorization, financial settlement and reconciliation, returns management and collection.

22. A method as recited in claim 16, further comprising sharing consumer transaction information with said issuing merchants in response to the execution of electronic funds transactions using said merchant based debit cards.

23. A method as recited in claim 16, wherein said limits of card usage comprise a monetary limit set for a single transaction, a monetary rate limit for transactions within a given period of time, or combinations thereof.

24. A method as recited in claim 23, wherein said limits of card usage comprise a variable velocity feature in which limits are set for transaction amount, daily frequency of debit card use, and time sensitive usage values.

25. A system for facilitating electronic funds transactions between a cardholder and a merchant, comprising:
a debit card containing point of sale readable account information, as part of a plurality of said debit cards issued to consumers within a merchant-based debit card program:
wherein said debit card is issued by a merchant, participating in said merchant-based debit card program as an issuing merchant, to a qualified consumer that submits valid demand deposit account (DDA) information for a checking account and valid identification information;
said merchant based debit card having a card number beginning with a unique International Standards Organization (ISO) identification number assigned for the given merchant based debit card network to which transactions are routed for processing;
wherein said qualified consumer becomes a cardholder having a privilege under said debit card program to execute purchase transactions at a plurality of merchants participating in said merchant-based debit card program as acquiring merchants;
a network enabled computer having a debit card data base of cardholder and merchant information supplied and maintained in said data base by a plurality of issuing merchants participating in said merchant-based debit card program;
wherein said issuing merchants have access to said data base of cardholder information for retrieving information about consumer transactions using said merchant-based debit card and changing cardholder information within said database;

wherein said network enabled computer is adapted for communication through card processing services with point of sale (POS) transaction terminals; and programming associated with said computer for,
- receiving transaction information from point of sale transaction terminals in response to an attempted purchase transaction by said cardholder using said debit card,
- verifying cardholder identity associating a personal identifier with customer information from said data base,
- issuing a declined message and terminating card processing if the card is invalid or the requested transaction falls outside the limits of card usage,
- accepting said transaction executing said debit transaction,
- settling the transaction at a lime subsequent to the execution of said transaction through a card processing service from funds retained within an associated checking account,
- charging the acquiring merchant a Tee for executing said transaction, and
- remitting a portion of said charged fee to the issuing merchant of said merchant based debit card.

26. A system as recited in claim 25, wherein said issuing merchants perform the qualifying of said consumers and assume at least a portion of the financial responsibility to guarantee the transactions for the acquiring merchants.

27. A system as recited in claim 25:
- wherein said merchant based debit card is co-issued by said issuing merchant and a guarantor entity;
- wherein said guarantor entity provides a guarantee to acquiring merchants as to the payment of executed transactions; and
- wherein said guarantee is made to said issuing merchant by said guarantor in exchange for monetary considerations thereof.

28. A system as recited in claim 25, wherein said checking account comprises the checking account of an associated cardholder.

29. A system as recited in claim 25:
- wherein said debit card comprises a prepaid debit card and said checking account comprises a checking account held by said issuing merchant, or alternatively a third party providing services to said issuing merchant; and
- wherein the cash value of said prepaid debit card is associated with a checking account of the issuing merchant, or a third party, which contains sufficient funds to cover said cash value.

* * * * *